US012647721B2

(12) United States Patent
Yu et al.

(10) Patent No.: US 12,647,721 B2
(45) Date of Patent: Jun. 2, 2026

(54) DEEP AUDIO ZOOMING: BEAMWIDTH-CONTROLLABLE NEURAL BEAMFORMER

(71) Applicant: TENCENT AMERICA LLC, Palo Alto, CA (US)

(72) Inventors: Meng Yu, Bellevue, WA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 197 days.

(21) Appl. No.: 18/494,307

(22) Filed: Oct. 25, 2023

(65) Prior Publication Data

US 2025/0142251 A1 May 1, 2025

(51) Int. Cl.
*H04R 1/32* (2006.01)
*H04R 1/40* (2006.01)
*H04R 3/00* (2006.01)

(52) U.S. Cl.
CPC ............. *H04R 1/326* (2013.01); *H04R 1/406* (2013.01); *H04R 3/005* (2013.01)

(58) Field of Classification Search
CPC ......... H04R 1/326; H04R 1/406; H04R 3/005
USPC ......................................... 381/56, 58, 91, 92
See application file for complete search history.

(56) References Cited

U.S. PATENT DOCUMENTS

2011/0129095 A1* 6/2011 Avendano ............. H04R 3/005 381/63
2013/0022217 A1 1/2013 Jeong et al.
2017/0178662 A1* 6/2017 Ayrapetian .......... G10L 21/0208
2018/0338213 A1 11/2018 Lehtiniemi et al.
2022/0108713 A1 4/2022 Zheng et al.
2023/0021379 A1 1/2023 Vilermo et al.
2024/0031765 A1* 1/2024 Munoz .................... H04S 7/303

OTHER PUBLICATIONS

Ngoc, Audio zoom for smartphones based on multiple adaptive beamformers (Year: 2019).*
International Search Report dated Aug. 5, 2024 in International Application No. PCT/US24/24334.
Written Opinion dated Aug. 5, 2024 in International Application No. PCT/US24/24334.
Ngoc Q. K. Duong et al., "Audio Zoom for Smartphones Based on Multiple Adaptive Beamformers", HAL open science, 13th International Conference on Latent Variable Analysis and Signal Separation, Feb. 2017, 6 pages.

(Continued)

*Primary Examiner* — William A Jerez Lora
(74) *Attorney, Agent, or Firm* — Sughrue Mion, PLLC

(57) ABSTRACT

A method and apparatus comprising computer code configured to cause a processor or processors to receive multiple audio signals obtained from ones of a plurality of microphones of a microphone array, implement an audio zooming based on the audio signals by selectively focusing and enhancing first ones of the audio signals and by attenuating other ones of the audio signals, and control an output of audio based on the audio zooming, and the audio zooming includes a consolidating of a plurality of directional features of the first ones of the audio signals within a field around the microphone array and a countering based on determining directional aspects of the other ones of the audio signals from outside of the field.

20 Claims, 12 Drawing Sheets

500

(56) References Cited

OTHER PUBLICATIONS

Zhuo Chen et al., "Multi-Channel Overlapped Speech Recognition With Location Guided Speech Extraction Network", 2018, 8 pages.
Zhong-Qiu Wang et al., "Multi-Channel Deep Clustering: Discriminative Spectral and Spatial Embeddings for Speaker-Independent Speech Separation", Mitsubishi Electric Research Laboratories, IEEE ICASSP 2018, 7 pages.
Zhong-Qiu Wang et al., "Combining Spectral and Spatial Features for Deep Learning Based Blind Speaker Separation", IEEE/ACM Transactions on Audio, Speech, and Language Processing, Feb. 2019, pp. 457-468, vol. 27, No. 2.
Rongzhi Gu et al., "Multi-modal Multi-channel Target Speech Separation", IEEE Journal of Selected Topics in Signal Processing, 2020, pp. 1-12.
Tara N. Sainath et al., "Learning the Speech Front-end With Raw Waveform CLDNNs", 2015, 5 pages.
Tara N. Sainath et al., "Multichannel Signal Processing with Deep Neural Networks for Automatic Speech Recognition", 2017, pp. 1-15.
Jimmy Lei Ba et al., "Layer Normalization", 2016, pp. 1-14, arXiv:1607.06450v1 [stat. ML] Jul. 21, 2016.
Jonathan Le Roux et al., "SDR—Half-Baked or Well Done?", 2019, pp. 1-5, arXiv:1811.02508v1 [cs.SD] Nov. 6, 2018.
David Diaz-Guerra et al., "gpuRIR: A Python Library for Room Impulse Response Simulation with GPU Acceleration", Multimedia Tools and Applications, 2020, 21 pages, arXiv:1810.11359v4 [eess. AS] Oct. 9, 2020.
Jiayu Du et al., "AISHELL-2: Transforming Mandarin ASR Research Into Industrial Scale", 2018, 3 pages, arXiv:1808.10583v2 [cs.CL] Sep. 13, 2018.

* cited by examiner

400

500

600

700

800

900

1100

DEEP AUDIO ZOOMING: BEAMWIDTH-CONTROLLABLE NEURAL BEAMFORMER

BACKGROUND

1. Field

The present disclosure is directed to deep audio zooming with beamwidth-controllable neural beamformer features.

2. Description of Related Art

Audio zooming, a signal processing technique, enables selective focusing and enhancement of sound signals from a specified region, attenuating others. While traditional beamforming and neural beamforming techniques, centered on creating a directional array, necessitate the designation of a singular target direction, those techniques may overlook the concept of a field of view (FOV), that defines an angular area.

That is, audio zooming technology refers to a signal processing technique that allows a user to selectively focus on and enhance the audio signals originating from a specific region of interest in a sound field, while attenuating signals from other directions. Audio zooming technology finds applications in various fields, including teleconferencing, surveillance, broadcasting and video filming. In teleconferencing, audio zooming can improve the intelligibility of speech by isolating the sound signals from the target speakers' region and reducing background noises and interfering speakers. In surveillance, audio zooming can be used to monitor specific regions of interest by focusing on sounds originating from those regions, while suppressing sounds from other directions. In broadcasting, audio zooming can enhance the experience of viewers by allowing them to selectively listen to commentary or sound effects while reducing the volume of other sounds in the broadcast. With the audio zooming feature, a user can adjust the video recording's focus using a pinch motion on the screen. When the user zooms in, the audio from the users focal point becomes more pronounced. Conversely, as the user zooms out, the ambient sounds become more evident and are no longer diminished.

Beamforming is the most closely related field of study to this concept. It is a computational technique that involves constructing a directional microphone using an array of omnidirectional microphones. By exploiting the different time delays of signals arriving from different directions, beamforming combines the microphone signals into an output signal that amplifies the sound from the target direction while suppressing all other sounds for monoaural directional sound filtering. In nearly all beamforming techniques, it is necessary to specify or estimate a single target direction, which plays a crucial role in the mathematical formulation of beamforming. Most beamforming techniques share the same objective of improving the sound quality from a single direction. However, those techniques do not take into account the concept of a FOV. In addition, beamforming typically requires a large microphone array to create a narrow beam that captures sound from a specific direction. The width of the enhanced beam in beamforming is fixed and determined by several factors, including the microphone configuration, signal frequency, and type of beamformer used. There has been proposed an audio zooming implementation that combines several robust adaptive beamformers with a derived post-processing algorithm to further enhance the targeted sound source, and the enhanced targeted sound source is weighted mixed with the original microphone signal to create the audio zoom effect. There has also been proposed to calculate the sound spectral covariance matrices, considering both the desired audio signals inside the FOV and those outside it, and by addressing a generalized eigenvalue problem with these estimated matrices, the solved beamformer can enhance sounds originating within the FOV. However, one constraint of these techniques is that in environments with sound reflections, audio waves from a source outside the FOV can reach the microphone after bouncing off surfaces from within the FOV. Under these circumstances, their audio zooming technique would continue to amplify these reflected sound signals, which is a technical problem arising in that technology.

And for any of those reasons there is therefore a desire for technical solutions to such problems that arose in computer audio technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive multiple audio signals obtained from ones of a plurality of microphones of a microphone array, implementing code configured to cause the at least one processor to implement an audio zooming based on the audio signals by selectively focusing and enhancing first ones of the audio signals and by attenuating other ones of the audio signals; and controlling code configured to cause the at least one processor to control an output of audio based on the audio zooming, wherein the audio zooming comprises a consolidating of a plurality of directional features of the first ones of the audio signals within a field around the microphone array and a countering based on determining directional aspects of the other ones of the audio signals from outside of the field.

The audio zooming may include sampling the audio signals along a pre-set number of directions evenly partitioned around the microphone array.

The pre-set number may be 36.

Consolidating the plurality of directional features may be based on determining $$D_{\mathcal{F}_{in}}(t, f) = \max_{\theta_k \in \mathcal{F}_{in}} d_{\theta_k}(t, f),$$

where $\mathcal{F}$ in represents an index set of sectors encircling the microphone array, $d_{\theta_k}$ represents ones of the directional features, t and f respectively represent a total number of frames and frequency bands of a complex spectrogram of the audio signals, k represents the pre-set number, and θ represents an azimuth.

The countering may be based on determining $$D_{\mathcal{F}_{out}}(t, f) = \max_{\theta_k \in \mathcal{F}_{out}} d_{\theta_k}(t, f),$$

where $\mathcal{F}_{out}$ represents a second index set of the sectors encircling the microphone array.

The audio zooming may be based on consolidating field-of-view feature vectors based on a concatenation represented as $\mathcal{D}_{\mathcal{F}_{in},\mathcal{F}_{out}}=[\mathcal{D}_{\mathcal{F}_{in}},\mathcal{D}_{\mathcal{F}_{out}}]\in\mathbb{R}^{T\times 2F}$, where $d_{\theta_k}\in\mathbb{R}^{T\times F}$ represents each of the directional features.

The audio zooming may be based on post-processing determined as $$\mathcal{D}_{\mathcal{F}_{in},\mathcal{F}_{out}}(t,f)=\begin{cases}-1 & \text{if } \mathcal{D}_{\mathcal{F}_{in}}(t,f)\leq\mathcal{D}_{\mathcal{F}_{out}}(t,f)\\ \mathcal{D}_{\mathcal{F}_{in}}(t,f) & \text{else}\end{cases}.$$

The audio zooming may be applied to a 3D space by modifying $d_{\theta_k}$ to $$\angle v_{\theta}^{(m)}(f):=2\pi f\Delta^{(m)}\cos\theta^{(m)}\cos\alpha^{(m)}/c,$$

where α represents an elevation angle, where c represents a speaker in the 3D space, where m represents a microphone of the microphone array.

The audio zooming may be based on a neural network.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
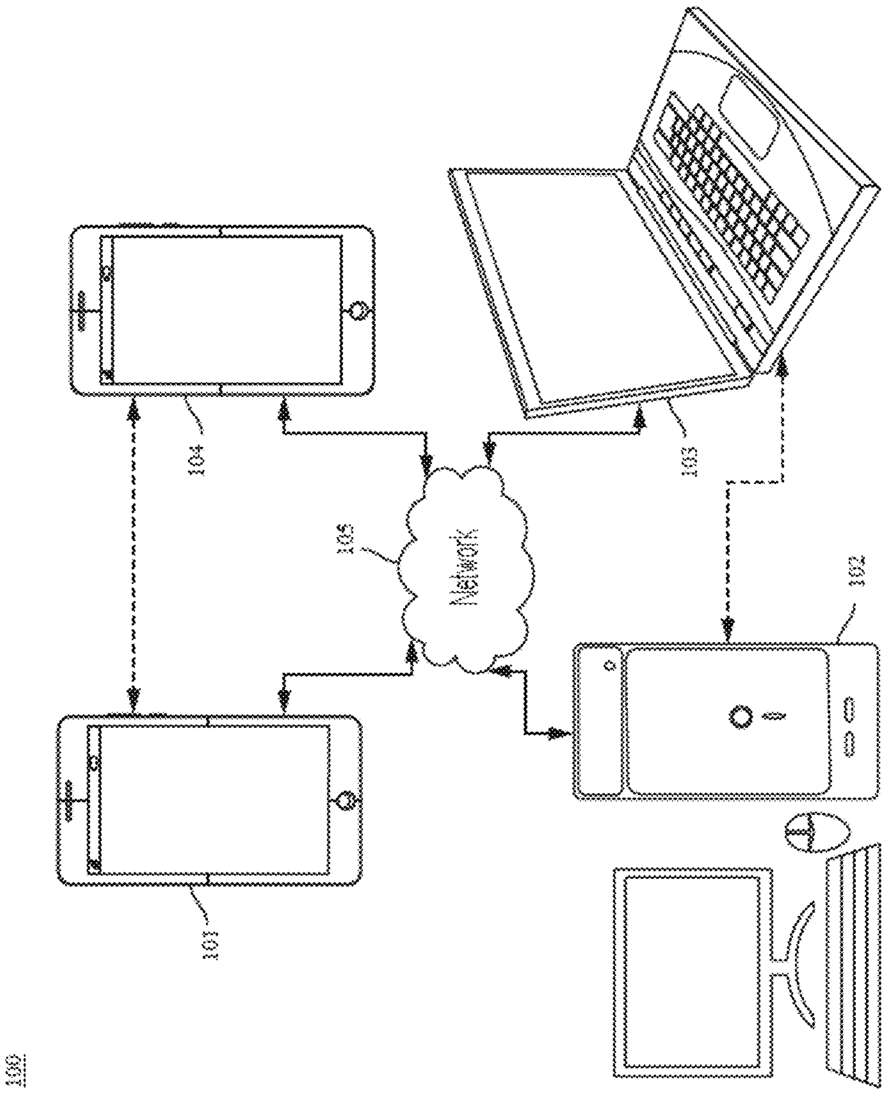
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
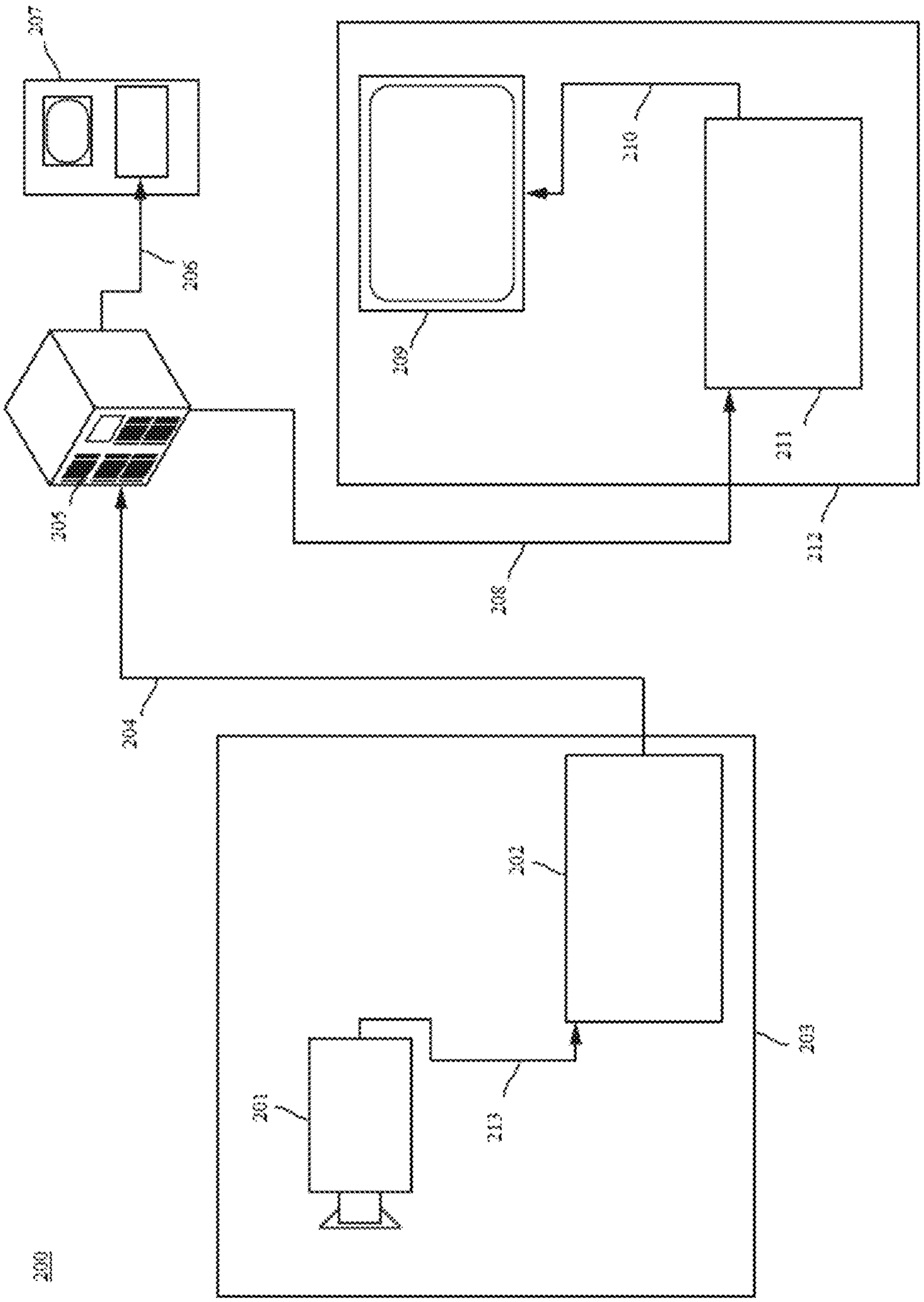
FIG. 2 is a simplified block diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
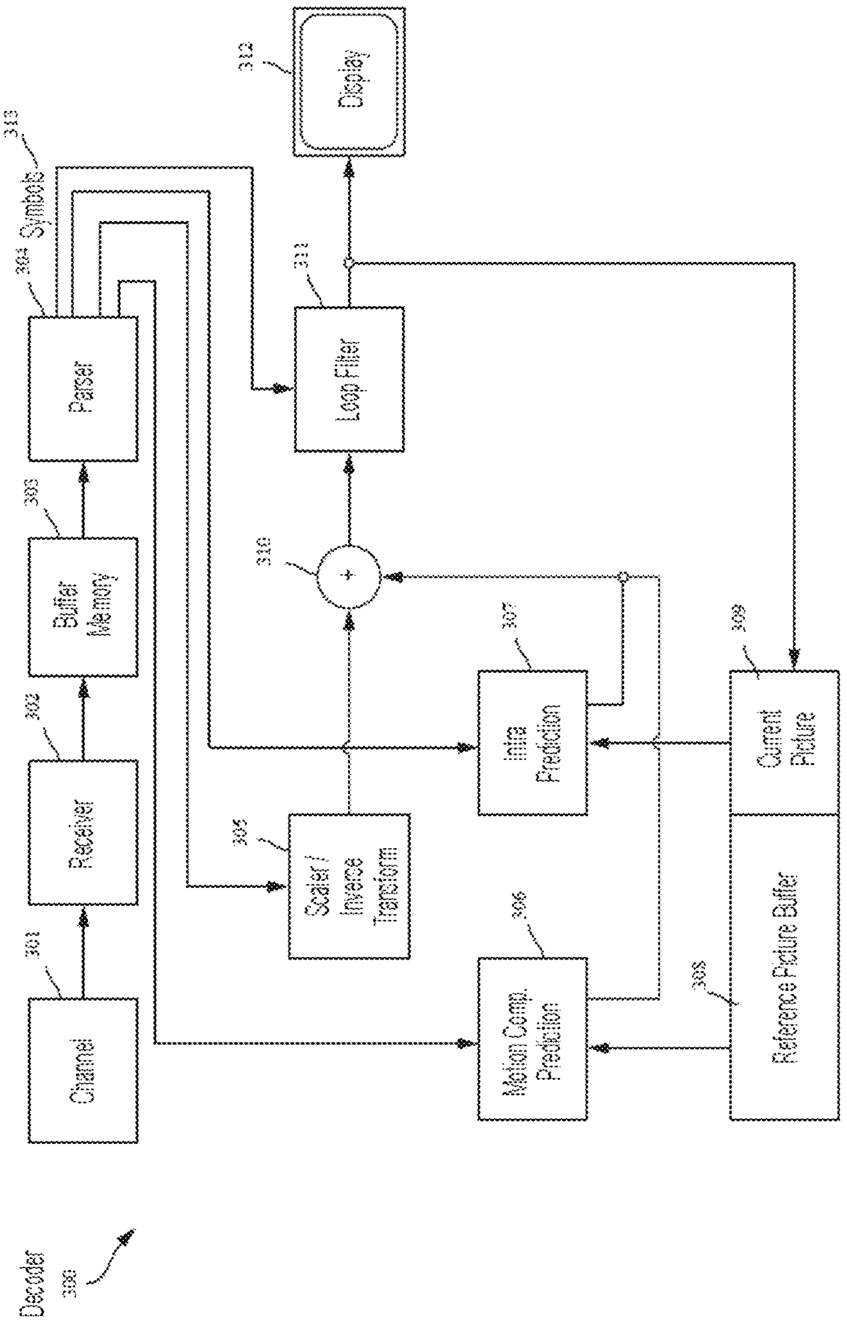
FIG. 3 is a simplified illustration in accordance with embodiments.

FIG. 3 may be a functional block diagram of a video decoder 300 according to an embodiment of the present disclosure.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Embodiments herein may be applied in such environments, such as 2 or more dimensional video conferencing, surveillance, or hearing aids or karaoke environments or theatre environments or the like that may experience acoustic deterioration and may be improved by audio zoom.

Figure 4:
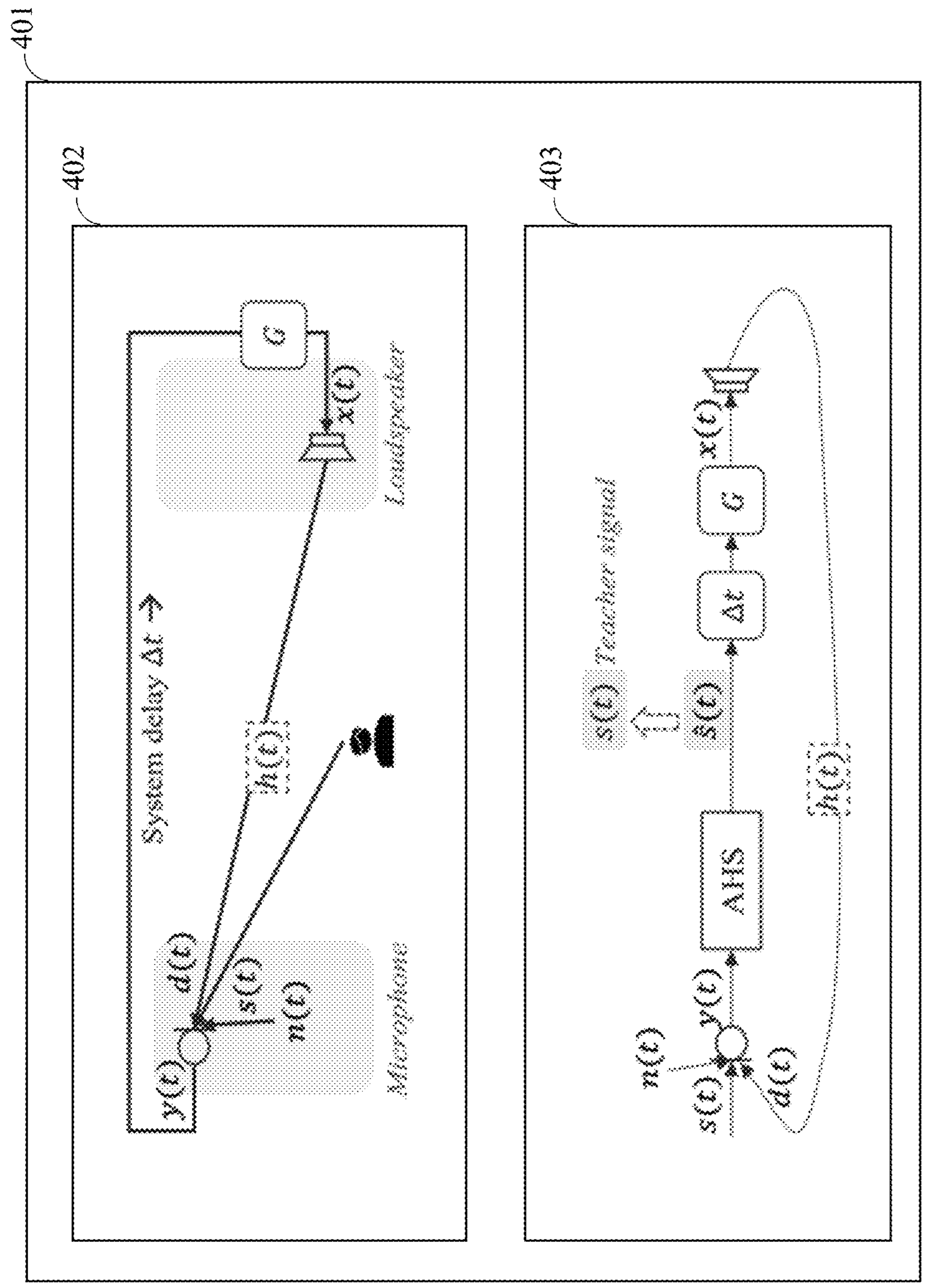
FIG. 4 is a simplified illustration in accordance with embodiments.

FIG. 4 illustrates an example 400 of a single-channel acoustic amplification system 401 with a microphone and a loudspeaker coupled in the same space 402. The target speech is picked up by the microphone as s(t), which is then sent to the loudspeaker for acoustic amplification. The loudspeaker signal x(t) is played out and arrives at the microphone as a playback signal denoted as d(t):

$$d(t) = NL(x(t)) * h(t) \qquad \text{Eq. (1)}$$

where NL(.) denotes the nonlinear distortion introduced by the loudspeaker, h(t) represents the acoustic path from loudspeaker to microphone, and * denotes linear convolution.

FIG. 4 also illustrates the signal flow 403 of an acoustic deterioration suppression system according to embodiments herein. For example, if without any processing, the loudspeaker signal x(t) will be a delayed and amplified version of y(t), and this playback signal d(t) will re-enter the pickup repeatedly, the corresponding microphone signal at time index t can be represented as:

$$y(t) = s(t) + n(t) + NL[y(t-\Delta t)\cdot G] * h(t) \qquad \text{Eq. (2)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as a form of acoustic deterioration.

Figure 5:
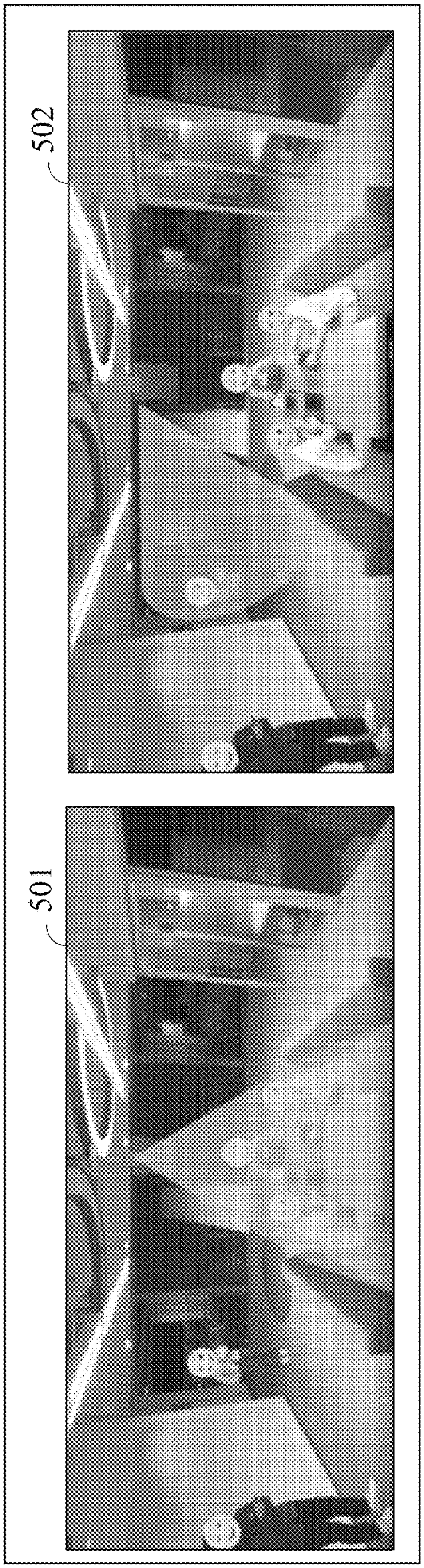
FIG. 5 is a simplified illustration in accordance with embodiments.

FIG. 5 illustrates an example 500 of an application scenario involving teleconferencing according to exemplary embodiments where, as in example 501, teleconferencing participants at a table may be emphasized by audio zooming such that sounds originating from within that table area are emphasized or zoomed while other sounds, even though reflecting from within that table area but not originating there are diminished. This may be done by user selection, such as if the example 501 represents a surveillance footage and the table area is highlighted by a user input to a display of that footage according to exemplary embodiments, or may be done automatically by detecting most speech from that table area according to exemplary embodiments. Similarly, as in example 502, instead, a person to the side of the table area from example 502 may instead be audio zoomed-in on by similar techniques according to exemplary embodiments.

Figure 6:
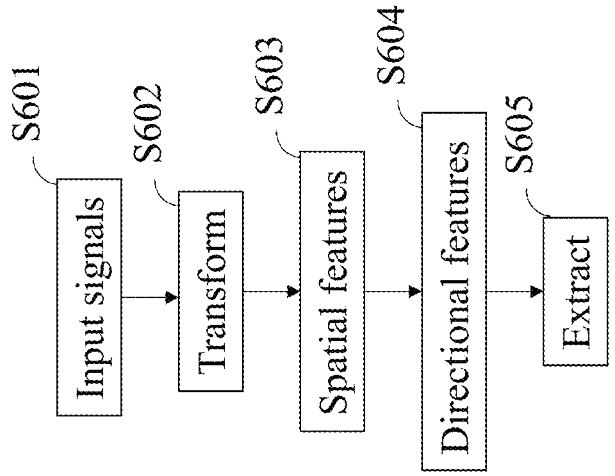
FIG. 6 is a simplified flow diagram in accordance with embodiments.

Viewing the example 600 of FIG. 6, through a short-time-Fourier-transform (STFT) at S602, the M microphone signals ym, input at S601, are transformed to its complex spectrum Ym, where m=1, 2 . . . , M. One of the spatial features, IPD, is computed at S603 by the phase difference between channels of complex spectrograms as:

$$IPD(m)(t, f) = \angle Ym1(t, f) - \angle Ym2(t, f) \qquad \text{Eq. (3)}$$

where m1 and m2 are two microphones of the m-th microphone pair out of M selected microphone pairs.

A directional feature (DF) is incorporated at S604 as a target speaker bias. According to embodiments, this feature computes the averaged cosine distance between the target speaker steering vector and IPD on all selected microphone pairs as $$d_\theta(t, f) = \sum_{m=1}^{M} \left\langle e^{\angle v_0^{(m)}(f)}, e^{IPD^{(m)}(t,f)} \right\rangle \qquad \text{Eq. (4)}$$

where $$\angle v_\theta^{(m)}(f) := 2\pi f \Delta^{(m)} \cos\theta^{(m)} / c$$

is phase of the steering vector for target speaker from θ at frequency f with respect to m-th microphone pair, Δ(m) is the distance between the m-th microphone pair, c is the sound velocity, and vector e(·):=[cos(·), sin(·)]T.

If the T-F bin (t, f) is dominated by the source from θ, then dθ (t, f) will be close to 1, otherwise it deviates towards −1.

As a result, dθ (t, f) indicates if a speaker from a desired direction θ dominates in each T-F bin, which drives the network to extract, at S605, the target speaker from the mixture.

Figure 7:
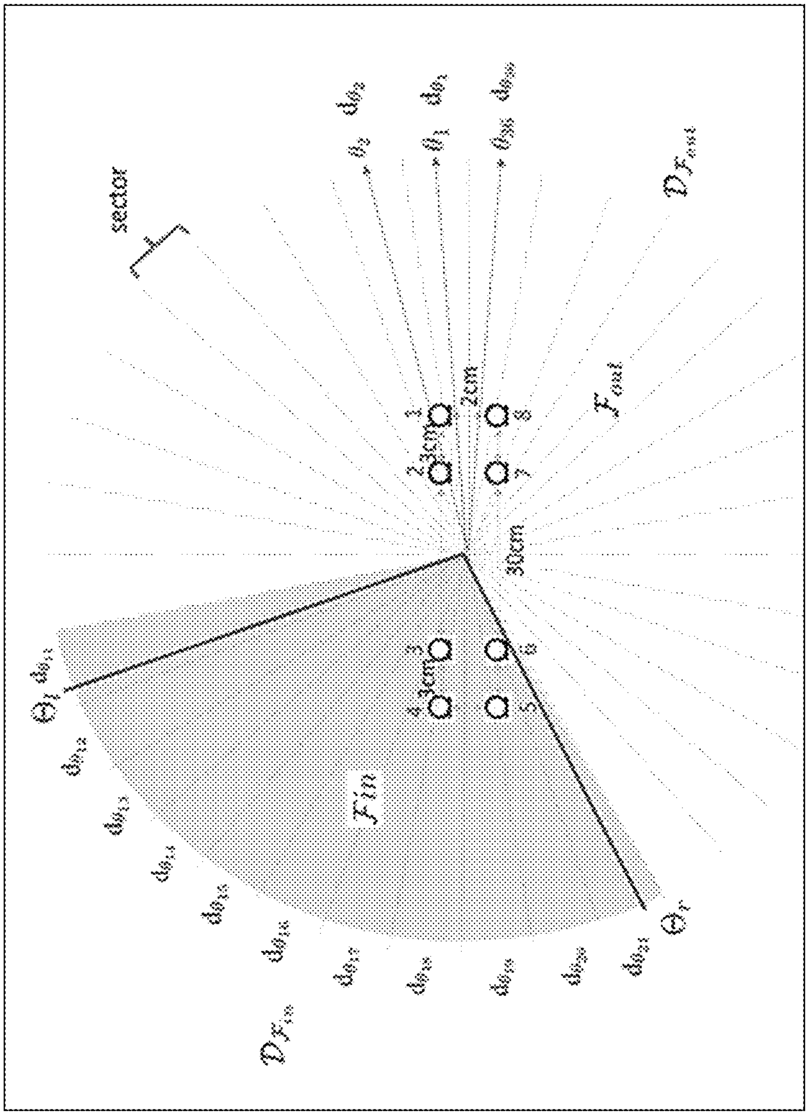
FIG. 7 is a simplified illustration in accordance with embodiments.

According to embodiments, when there is even division of the space into several sectors, such as shown in the demonstration of audio zooming in a 2D FOV feature extraction example 700 of FIG. 7, a desired angular field could encompass multiple sectors. By sampling a direction at the bisector of each sector, embodiments establish the idea of multi-look directions. The idea of "multi-look direction" applies to speech separation and multi-channel acoustic model, respectively, where a small number of spatial look directions cover all possible target speaker directions.

According to embodiments, a neural network-driven multi-look enhancement employs directional features from various look directions as input. This enables the model to concurrently enhance multiple sampled look directions. A set of K directions in the horizontal plane is sampled. For example, K=36 and the horizontal space is evenly partitioned to 36 sectors. The azimuths of look directions $\theta_{1,2,\ldots,36}$={5°, 15°, . . . 345°, 355°}, corresponding to the sectors [0, 10], [10, 20], . . . , [340, 350], and [350, 360], respectively. The azimuths of look directions $\theta_{1,2,\ldots,K}$ result in K directional feature vectors $d_\theta$, k=1, 2, . . . , K. The value of directional feature in a T-F bin is large if a speaker close to the desired direction is dominant in this bin. Furthermore, this value decreases as the source deviates from the desired look direction.

Figure 8:
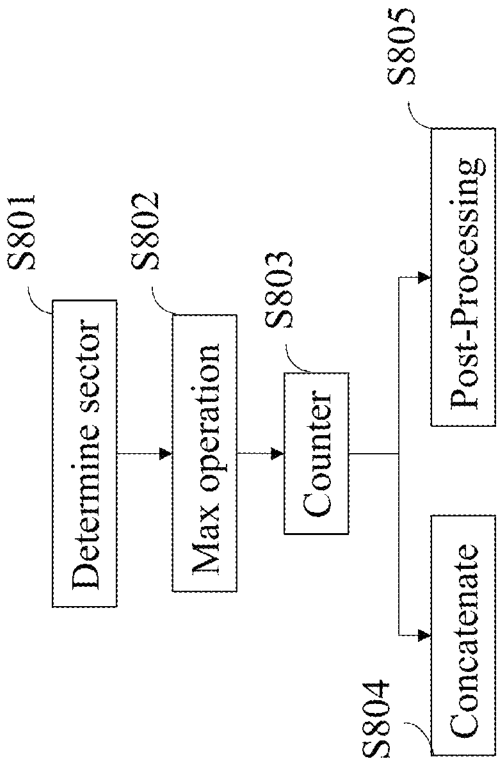
FIG. 8 is a simplified flow diagram in accordance with embodiments.

According to exemplary embodiments, see example 800 of FIG. 8, showing that, for a user-specified FOV delineated by the angular boundaries [Θl, Θr] such as when an input to a screen or the like is received by the system, embodiments may, after receiving that user input, first, at S801, determine the corresponding sector of these boundaries. The sectors on and within the range [Θl, Θr] are represented by it index set $\mathcal{F}$ in. On the other hand, sectors that fall outside these boundaries are represented by $\mathcal{F}_{out}$. And this difference may be determined by the user input, such as by correlating touched or selected portions of a screen with a displayed area that may be audio-zoomed on that screen. Each of the directional feature $d_{\theta_k} \in \mathbb{R}^{T\times F}$ where T and F are the total number of frames and frequency bands of the complex spectrogram, respectively. By concatenating the values of $d_{\theta_k}$ where $k \in \mathcal{F}_{in}$, the resulting dimension becomes considerably large. Moreover, this dimension fluctuates with variations in the field size, making it unsuitable for model training. Therefore, embodiments herein introduce a method to consolidate the high-dimensional directional feature sets by employing, at S802, a max operation across the sectors, as detailed in Eq. 5

$$\mathcal{D}_{\mathcal{F}_{in}}(t, f) = \max_{\theta_k \in \mathcal{F}_{in}} d_{\theta_k}(t, f) \quad \text{Eq. (5)}$$

At the same time, embodiments incorporate, at S803, a counter FOV feature to represent all directional attributes beyond the angular field. Using both these features sharpens the sound capture, particularly near the boundaries of the FOV. This enhances the model's ability to differentiate between sound sources within and outside the targeted field. The counter FOV feature is computed similarly as $$\mathcal{D}_{\mathcal{F}_{out}}(t, f) = \max_{\theta_k \in \mathcal{F}_{out}} d_{\theta_k}(t, f) \quad \text{Eq. (6)}$$

There are two methods to further consolidate the two FOV feature vectors according to exemplary embodiments. A first approach, at S804, involves concatenation, represented as $$\mathcal{D}_{\mathcal{F}_{in},\mathcal{F}_{out}} = [\mathcal{D}_{\mathcal{F}_{in}}, \mathcal{D}_{\mathcal{F}_{out}}] \in \mathbb{R}^{T\times 2F} \quad \text{Eq. (7)}$$

And a second, at S805, is through post-processing, as calculated in $$\mathcal{D}_{\mathcal{F}_{in},\mathcal{F}_{out}}(t, f) = \begin{cases} -1 & \text{if } \mathcal{D}_{\mathcal{F}_{in}}(t, f) \le \mathcal{D}_{\mathcal{F}_{out}}(t, f) \\ \mathcal{D}_{\mathcal{F}_{in}}(t, f) & \text{else} \end{cases} \quad \text{Eq. (8)}$$

The post-processing aims to remove the components of speakers outside the desired region, thereby enhancing the prominence of the speakers within the region. The feature 2D extraction in horizontal plane is shown in the demonstration of audio zooming in 3D FOV feature extraction example 900 of FIG. 9.

F

F

F

Figure 9:
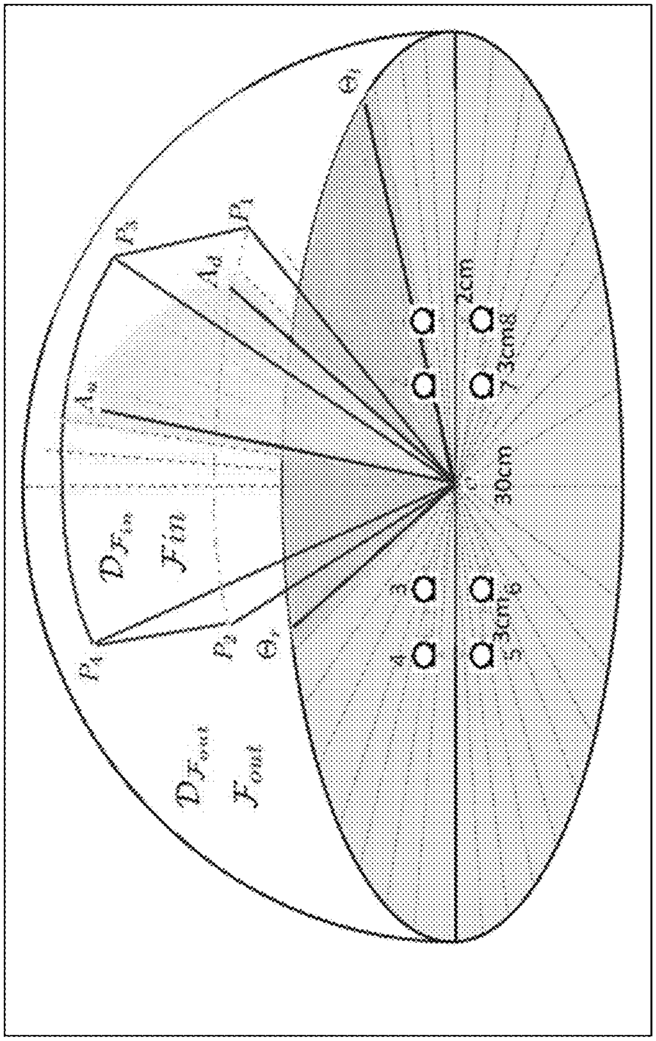
FIG. 9 is a simplified illustration in accordance with embodiments.

To adapt the aforementioned feature extraction to a 3D space, exemplary embodiments modify the original directional feature dθ in Eq. 4 such that $$\angle v_\theta^{(m)}(f) := 2\pi f \Delta^{(m)} \cos\theta^{(m)} \cos\alpha^{(m)} / c,$$

with α representing the elevation angle in the vertical dimension. Concurrently, the definitions of $\mathcal{F}$ in and $\mathcal{F}_{out}$ will also account for the preferred elevation span. As illustrated in FIG. 9, two lines at angles Θl and Θr delineate the desired angular boundary on the horizontal plane. Simultaneously, two lines at angles $A_u$ and $A_d$ set the boundary on the vertical plane. The associated sectors are represented by graying for the horizontal and vertical planes, respectively. When considering these angular boundaries in a 3D space collectively, the sectors within the field, denoted as $\mathcal{F}$ in, shape the pyramid defined by $\overline{O P_1 P_1 P_3 P_4}$.

Figure 10:
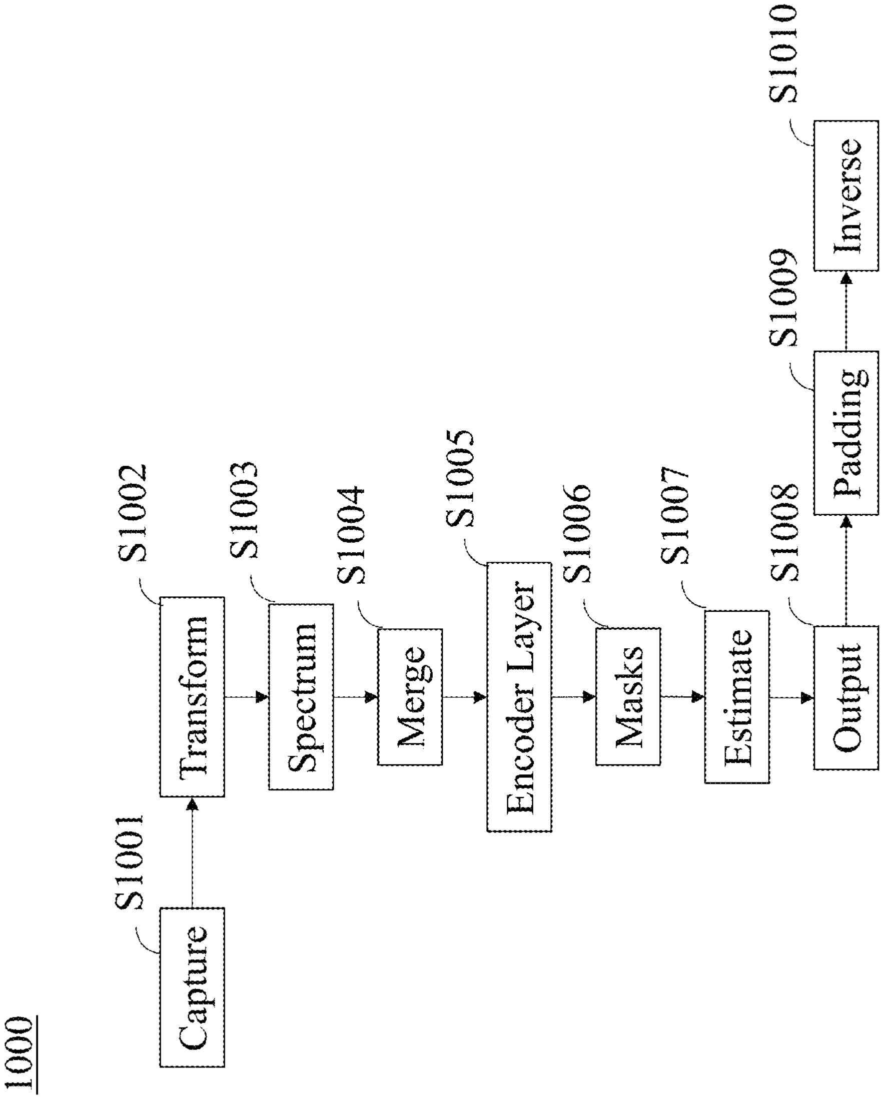
FIG. 10 is a simplified flow diagram in accordance with embodiments.

Embodiments, such as with example 1000 of FIG. 10, formulate the problem as amplifying speech signals from a specified angular range [Θl, Θr] (use 2D plane as an example), captured, at S1001, by a microphone array, amidst reverberation and background noise. That is, embodiments let $$s_c^m$$

denote the c-th speaker source received by the m-th microphone. The signal captured by the microphone at time t can be represented by $$y^m(t) = \sum_{c=1}^{C} s_c^m(t) + v^m(t), \quad \text{Eq. (7)}$$

$v^{m(t)}$ denotes the noise signal received by the m-th microphone. By, at S1002, computing STFT (512 window size and 256 hop size), a reference channel, e.g. the first channel complex spectrogram Y1, is used to compute, at S1003, logarithm power spectrum (LPS) by $\mathrm{LPS}=\log(|Y_1|^2)\in\mathbb{R}^{T\times F}$.

The single-channel spectral feature LPS, combined with the introduced audio zooming FOV feature $\mathcal{D}_{\mathcal{F}_{in},\mathcal{F}_{out}}$, are, at S1004, merged and utilized as the input for the neural network.

Embodiments exclude the direct current (DC) frequency band, specifically the initial frequency band. As a result, F is set to 256.

For each time frame, the input feature vector, Ψ, undergoes dimension projection to F via a linear projection layer, transitioning from $\psi\in\mathbb{R}^{T\times 3F}$ to $\bar{\psi}\in\mathbb{R}^{T\times F}$. Using the FOV feature outlined in Eq. 7 as a reference, the total input feature dimension along the frequency axis equates to 3F according to embodiments.

Figure 11:
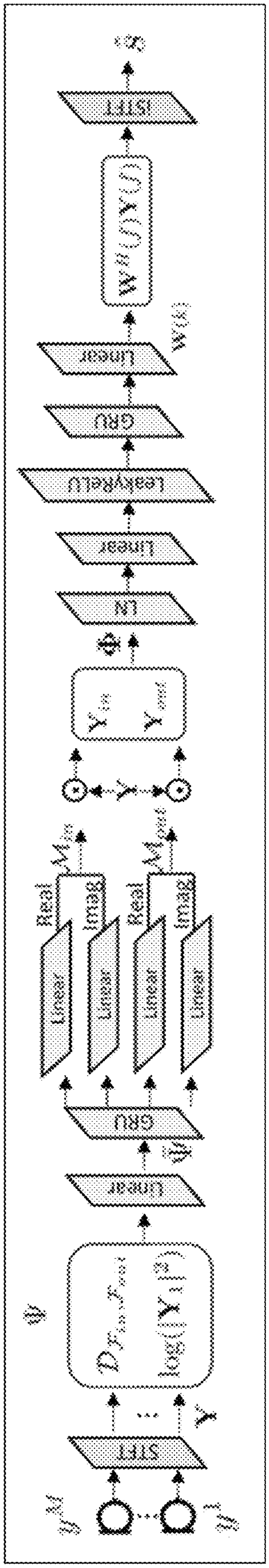
FIG. 11 is a simplified illustration in accordance with embodiments.

Subsequent to processing, at S1005, through a gated recurrent unit (GRU) encoder layer, the model, according to embodiments, deduces, at S1006, T×F dimensional complex-valued masks: $\mathcal{M}_{in}$ and $\mathcal{M}_{out}$ for source estimations within and outside the FOV, respectively, via four linear layers. Noise signals are associated with the sources outside the FOV since noise reduction is integral to our objective. The two masks are multiplied with each microphone spectrum Ym to, at S1007, estimate the target signals and interfering signals at each microphone m, resulting $$Y_{in}^{m} \text{ and } Y_{out}^{m},$$

respectively. M channels of real and imaginary parts of $Y_{in}$ and $Y_{out}$ are then concatenated, represented as Φ. According to embodiments, layer normalization may be utilized to normalize Φ, which in turn equalizes the training loss and gradients among various chunks within a mini-batch. After a linear projection with leakyRELU activation, a RNN layer together with a linear layer receive the sub-band embedding of individual frequency bands $\Phi_{proj}(f)\in\mathbb{R}^{T\times E}$, where f=1, 2, . . . F and E=32 is the dimension of the sub-band embedding, to estimate the enhancement filters at the corresponding frequency as $W(f)\in\mathbb{C}^{T\times M}$. Embodiments compute, at S1008, the output signal $\hat{S}$ by $W^{H}(f)Y(f)$. In the end, the output's DC band is padded, at S1009, with zeros to, at S1010, compute the inverse STFT, facilitating the production of a time-domain signal and thereby output of more appropriately audio-zoomed audio. The model structure is shown in the subband audio zooming model diagram 1100 of FIG. 11.

As such, embodiments herein represent a straightforward and potent techniques regarding angular region feature that allows the neural network model to perform audio zooming efficiently. The methods of random field of view sampling, converting field boundaries into look directions, and using a silence ratio-dependent loss function are all essential components for achieving beamwidth adjustable neural beamforming. Experimental results have shown the promise and industrial applicability of the pioneering deep learning-based audio zooming approach according to embodiments herein.

That is, with the increasing deployment of microphone arrays, multi-channel techniques have gained greater importance. An array of microphones can produce several recordings, which carry spatial information about the source of a sound. The effectiveness of established spatial features, such as inter-channel phase difference (IPD), has been demonstrated when integrated with monaural spectral features at the input stage for speech separation methods that use time-frequency (T-F) masking. Additionally, to further improve the extraction of source signals from a specific direction, meticulously crafted directional features indicating the dominant directional source in each time-frequency (T-F) bin have been introduced as the input features to the neural network models. These directional features are contingent upon a specific direction of interest. Drawing inspiration from previous multi-look neural beamformer and the multi-zone neural beamformer techniques, embodiments herein have introduced a FOV feature that consolidates all directional features within the desired field of interest. Simultaneously, embodiments integrate a counter FOV feature to signify all the directional features outside the angular field. Employing both these features refines sound capture, especially around the FOV's edges. Contrary to a directional feature, the FOV feature signifies the prevalence of all audio sources within the user-specified field of view. When this feature is input into the neural network, this features according to embodiments ensures the capture of all sound sources or speakers within the designated angular field, while attenuating those outside this zone.

As such, key features of embodiments of this disclosure may be understood as representing technical improvements to (1) Field of View (FOV) Features (Embodiments herein introduce a unique FOV feature that consolidates all directional attributes within a user-defined region or angular field. It encapsulates sound signals from a designated region, enhancing the capture of desired sound sources), (2) Counter FOV Features (This is a complementary feature to the FOV Features. The counter FOV features capture and represent directional characteristics outside the desired angular field or region. It aids in refining the sound capture, particularly around the edges of the FOV), (3) Integration with Neural Network Models (The FOV and counter FOV features are designed to be input features for neural network models. This integration ensures efficient extraction of sound sources within the designated FOV, emphasizing the capture of all desired sound sources and attenuating undesired ones), and (4) Low-Power Subband Model for Real-time Applications (Embodiments herein seamlessly incorporates the angular FOV feature into a low-power subband model, and is thereby applied to real-time applications according to embodiments.)

To achieve such features, the following improved functions are provided by exemplary embodiments: (1) Selective Sound Enhancement (Embodiments herein allow users to selectively focus on and enhance audio signals from a specific region while attenuating signals from undesired directions), (2) Isolation of Targeted Sounds (Especially useful in applications like teleconferencing, the feature can isolate sounds emanating from target speakers, thereby improving speech clarity and reducing background noises), (3) Sound Monitoring in Specific Regions (In surveillance scenarios, the audio zooming feature focuses on sounds originating from specific regions of interest, suppressing unwanted noises from other areas), (4) Enhanced Audio-Visual Experience (In broadcasting, viewers can choose to listen selectively to specific sound effects or commentaries, enhancing their overall experience), and (5) Adaptive Sound Capture (Embodiments herein adapt based on user preferences, ensuring the sound from the desired region is pronounced, and as users zoom out, ambient sounds are no longer diminished).

Exemplary embodiments herein are applied to various scenarios such as (1) Teleconferencing (Improve the intelligibility of speech by isolating the sound signals from the target speakers' region and reducing background noises. FIG. 5 illustrates a sound capture within one of multiple user-specified areas, denoted by the illustrated pyramidal shapes), (2) Surveillance: (Focus on specific regions of interest, capturing sounds from those areas and attenuating sounds from unrelated zones), (3) Broadcasting (Provide an enhanced viewer experience by allowing selective listening to specific audio segments or commentaries), (4) Video Filming (Users can adjust the focus of a video recording using a pinch motion on the screen, and the corresponding audio zooms in or out accordingly), (5) Speech Separation Methods (With the incorporation of the invented FOV spatial features, the invention can be employed in speech separation methods that utilize time-frequency (T-F) masking), and (5) Directional Sound Filtering (Especially in environments with sound reflections, this invention helps in filtering and zooming in on the desired sound source even when there are reflected sound signals.)

Accordingly, embodiments herein provide a simple yet effective FOV feature, amalgamating all directional attributes within the user-defined field. In conjunction, embodiments have introduced a counter FOV feature capturing directional aspects outside the desired field. Such advancements ensure refined sound capture, particularly emphasizing the FOV's boundaries, and guarantee the enhanced capture of all desired sound sources inside the user-defined filed. Experimental results have demonstrated the efficacy of the introduced angular FOV feature and its seamless incorporation into a low-power subband model suited for and applied to real-time applications.

The techniques described above, can be implemented as computer software using computer-readable instructions and physically stored in one or more computer-readable media or by a specifically configured one or more hardware processors. For example, FIG. 12 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
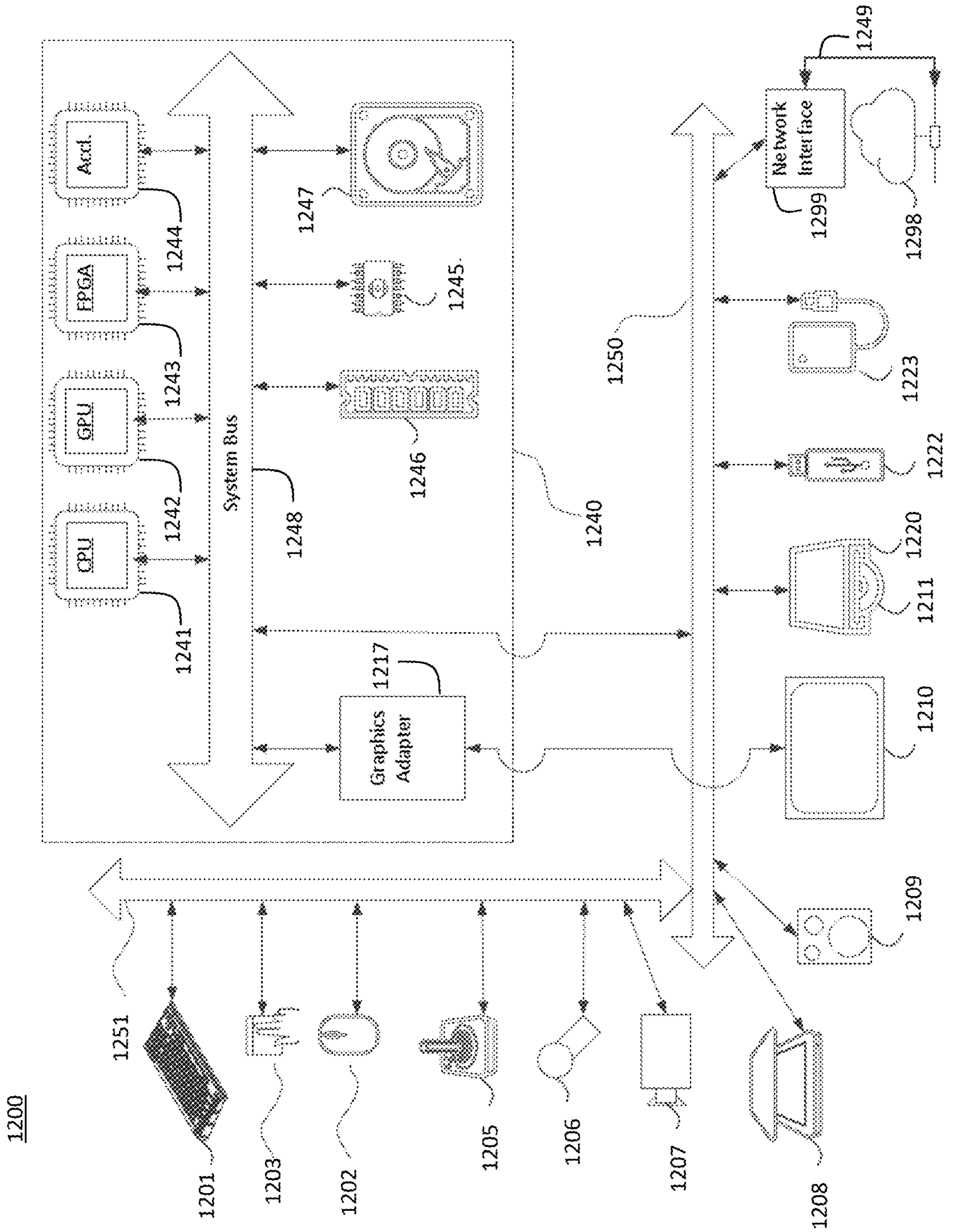
FIG. 12 is a simplified illustration in accordance with embodiments.

The components shown in FIG. 12 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, joystick 1205, microphone 1206, scanner 1208, camera 1207.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, or joystick 1205, but there can also be tactile feedback devices that do not serve as input devices), audio output devices (such as: speakers 1209, headphones (not depicted)), visual output devices (such as screens 1210 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD 1211 or the like media, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface 1299 to one or more communication networks 1298. Networks 1298 can for example be wireless, wireline, optical. Networks 1298 can further be local, wide-area, metropolitan, vehicular and industrial, real-time, delay-tolerant, and so on. Examples of networks 1298 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1298 commonly require external network interface adapters that attached to certain general-purpose data ports or peripheral buses (1250 and 1251) (such as, for example USB ports of the computer system 1200; others are commonly integrated into the core of the computer system 1200 by attachment to a system bus as described below (for example Ethernet interface into a PC computer system or cellular network interface into a smartphone computer system). Using any of these networks 1298, computer system 1200 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1240 of the computer system 1200.

The core 1240 can include one or more Central Processing Units (CPU) 1241, Graphics Processing Units (GPU) 1242, a graphics adapter 1217, specialized programmable processing units in the form of Field Programmable Gate Areas (FPGA) 1243, hardware accelerators for certain tasks 1244, and so forth. These devices, along with Read-only memory (ROM) 1245, Random-access memory 1246, internal mass storage such as internal non-user accessible hard drives, SSDs, and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1249. Architectures for a peripheral bus include PCI, USB, and the like.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieval to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of audio processing, the method performed by at least one processor and comprising:

receiving multiple audio signals obtained from ones of a plurality of microphones of a microphone array;

implementing an audio zooming based on the audio signals by selectively focusing and enhancing first ones of the audio signals and by attenuating other ones of the audio signals; and controlling an output of audio based on the audio zooming, wherein the audio zooming comprises a consolidating of a plurality of directional features including first frequency bands of the first ones of the audio signals within a field around the microphone array and a countering based on determining directional aspects including second frequency bands of the other ones of the audio signals from outside of the field.

2. The method according to claim 1, wherein the audio zooming further comprises sampling the audio signals along a pre-set number of directions evenly partitioned around the microphone array.

3. The method according to claim 2, wherein the pre-set number is 36.

4. The method according to claim 2, wherein consolidating the plurality of directional features is based on determining $$\mathcal{D}_{\mathcal{F}_{in}}(t, f) = \max_{\theta_k \in \mathcal{F}_{in}} d_{\theta_k}(t, f),$$

where $\mathcal{F}_{in}$ represents an index set of sectors encircling the microphone array, $d_{\theta_k}$ represents ones of the directional features, t and f respectively represent a total number of frames and frequency bands of a complex spectrogram of the audio signals, k represents the pre-set number, and θ represents an azimuth, the frequency bands of the complex spectrogram include the first frequency bands and the second frequency bands.

5. The method according to claim 4, wherein the countering is based on determining $$\mathcal{D}_{\mathcal{F}_{out}}(t, f) = \max_{\theta_k \in \mathcal{F}_{out}} d_{\theta_k}(t, f),$$

where $\mathcal{F}_{out}$ represents a second index set of the sectors encircling the microphone array.

6. The method according to claim 5, wherein the audio zooming is based on consolidating field-of-view feature vectors based on a concatenation represented as $\mathcal{D}_{\mathcal{F}_{in},\mathcal{F}_{out}} = [\mathcal{D}_{\mathcal{F}_{in},\mathcal{F}_{out}}] \in \mathbb{R}^{T\times 2F}$, where $d_{\theta_k} \in \mathbb{R}^{T\times F}$ represents each of the directional features.

7. The method according to claim 5, wherein the audio zooming is based on post-processing determined as $$\mathcal{D}_{\mathcal{F}_{in},\mathcal{F}_{out}}(t,f)=\begin{cases}-1 & \text{if } \tilde{\mathcal{D}}_{\mathcal{F}_{in}}(t,f)\le\mathcal{D}_{\mathcal{F}_{out}}(t,f)\\ \tilde{\mathcal{D}}_{\mathcal{F}_{in}}(t,f) & \text{else}\end{cases}.$$

8. The method according to claim 4, wherein the audio zooming is applied to a 3D space by modifying $$d_{\theta_k} \text{ to } \angle v_{\theta}^{(m)}(f):=2\pi f\Delta^{(m)}\cos\theta^{(m)}\cos\alpha^{(m)}/c,$$

where α represents an elevation angle, where c represents a speaker in the 3D space, where m represents a microphone of the microphone array.

9. The method according to claim 1, wherein the audio zooming is based on a neural network.

10. The method according to claim 1, wherein the output of audio based on the audio zooming is output in a teleconference.

11. An apparatus for audio processing, the apparatus comprising:

at least one memory configured to store computer program code;

at least one processor configured to access the computer program code and operate as instructed by the computer program code, the computer program code including:

receiving code configured to cause the at least one processor to receive multiple audio signals obtained from ones of a plurality of microphones of a microphone array;

implementing code configured to cause the at least one processor to implement an audio zooming based on the audio signals by selectively focusing and enhancing first ones of the audio signals and by attenuating other ones of the audio signals; and controlling code configured to cause the at least one processor to control an output of audio based on the audio zooming, wherein the audio zooming comprises a consolidating of a plurality of directional features including first frequency bands of the first ones of the audio signals within a field around the microphone array and a countering based on determining directional aspects including second frequency bands of the other ones of the audio signals from outside of the field.

12. The apparatus according to claim 11, wherein the audio zooming further comprises sampling the audio signals along a pre-set number of directions evenly partitioned around the microphone array.

13. The apparatus according to claim 12, wherein the pre-set number is 36.

14. The apparatus according to claim 12, wherein consolidating the plurality of directional features is based on determining $$\tilde{\mathcal{D}}_{\mathcal{F}_{in}}(t,f)=\max_{\theta_k\in\mathcal{F}_{in}} d_{\theta_k}(t,f),$$

where $\mathcal{F}_{in}$ represents an index set of sectors encircling the microphone array, $d_{\theta_k}$ represents ones of the directional features, t and f respectively represent a total number of frames and frequency bands of a complex spectrogram of the audio signals, k represents the pre-set number, and θ represents an azimuth, the frequency bands of the complex spectrogram include the first frequency bands and the second frequency bands.

15. The apparatus according to claim 14, wherein the countering is based on determining $$\mathcal{D}_{\mathcal{F}_{out}}(t,f)=\max_{\theta_k\in\mathcal{F}_{out}} d_{\theta_k}(t,f),$$

where $\mathcal{F}_{out}$ represents a second index set of the sectors encircling the microphone array.

16. The apparatus according to claim 15, wherein the audio zooming is based on consolidating field-of-view feature vectors based on a concatenation represented as $\mathcal{D}_{\mathcal{F}_{in},\mathcal{F}_{out}}=[\mathcal{D}_{\mathcal{F}_{in},\mathcal{F}_{out}}]\in\mathbb{R}^{T\times 2F}$, where $d_{\theta_k}\in\mathbb{R}^{T\times F}$ represents each of the directional features.

17. The apparatus according to claim 15, wherein the audio zooming is based on post-processing determined as $$\mathcal{D}_{\mathcal{F}_{in},\mathcal{F}_{out}}(t,f)=\begin{cases}-1 & \text{if } \tilde{\mathcal{D}}_{\mathcal{F}_{in}}(t,f)\le\mathcal{D}_{\mathcal{F}_{out}}(t,f)\\ \tilde{\mathcal{D}}_{\mathcal{F}_{in}}(t,f) & \text{else}\end{cases}.$$

18. The apparatus according to claim 14, wherein the audio zooming is applied to a 3D space by modifying $$d_{\theta_k} \text{ to } \angle v_{\theta}^{(m)}(f):=2\pi f\Delta^{(m)}\cos\theta^{(m)}\cos\alpha^{(m)}/c,$$

where α represents an elevation angle, where c represents a speaker in the 3D space, where m represents a microphone of the microphone array.

19. The apparatus according to claim 11, wherein the audio zooming is based on a neural network.

20. A non-transitory computer readable medium storing a program causing a computer to:

receive multiple audio signals obtained from ones of a plurality of microphones of a microphone array;

implement an audio zooming based on the audio signals by selectively focusing and enhancing first ones of the audio signals and by attenuating other ones of the audio signals; and control an output of audio based on the audio zooming, wherein the audio zooming comprises a consolidating of a plurality of directional features including first frequency bands of the first ones of the audio signals within a field around the microphone array and a countering based on determining directional aspects including second frequency bands of the other ones of the audio signals from outside of the field.

* * * * *